United States Patent
Kay et al.

[15] 3,675,472
[45] July 11, 1972

[54] APPARATUS AND METHOD FOR IMAGES OF THE INTERIOR STRUCTURE OF SOLID OBJECTS

[72] Inventors: Leslie Kay; Maxwell Glynn Maginness; Graham Bramwell Cook, all of Christchurch, New Zealand

[73] Assignee: National Research Development Corporation, London, England

[22] Filed: Dec. 11, 1969

[21] Appl. No.: 884,137

[30] Foreign Application Priority Data

Dec. 12, 1968   New Zealand..........................154,800

[52] U.S. Cl...........................73/67.5 R, 73/67.9, 340/5 MP
[51] Int. Cl............................................................G01n 29/00
[58] Field of Search................................73/67.5–67.8, 67.9; 340/5 MP

[56] References Cited

UNITED STATES PATENTS

| | | | |
|---|---|---|---|
| 3,373,602 | 3/1968 | Wendt et al. | 73/67.5 |
| 3,426,585 | 2/1969 | Zemanek et al. | 73/67.9 X |
| 3,548,642 | 12/1970 | Flaherty et al. | 73/67.5 |
| 2,431,862 | 12/1947 | Carlin | 73/67.6 |
| 2,700,895 | 2/1955 | Carson | 73/67.6 |
| 2,903,617 | 9/1959 | Turner | 315/12 |
| 3,431,462 | 3/1969 | Muenow et al. | 73/67.5 X |
| 3,475,551 | 10/1969 | Green et al. | 178/7.2 |

Primary Examiner—Richard C. Queisser
Assistant Examiner—Arthur E. Korkosz
Attorney—Cushman, Darby & Cushman

[57] ABSTRACT

The interior structure of objects, for example metal or tissues, is examined by insonifying the object and detecting reflected ultrasonic waves in a large receiving transducer at positions spaced at half wave-lengths of the highest insonification frequency from each other. The receiving positions are scanned and the received signals converted to digital form and processed to simulate the effect of an ultrasonic lens and the processed signals then displayed. Random spatial sampling of the positions may be effected to reduce the amount of data.

5 Claims, 10 Drawing Figures

RECEIVING APERTURE ($E_{mn}$)   DELAY ELEMENTS ($T_{mnkl}$)   SUMMERS ($\sigma_{kl}$)   DISPLAY DEVICE ($D_{kl}$)

TAPE PUNCH AND CONTROL LOGIC.

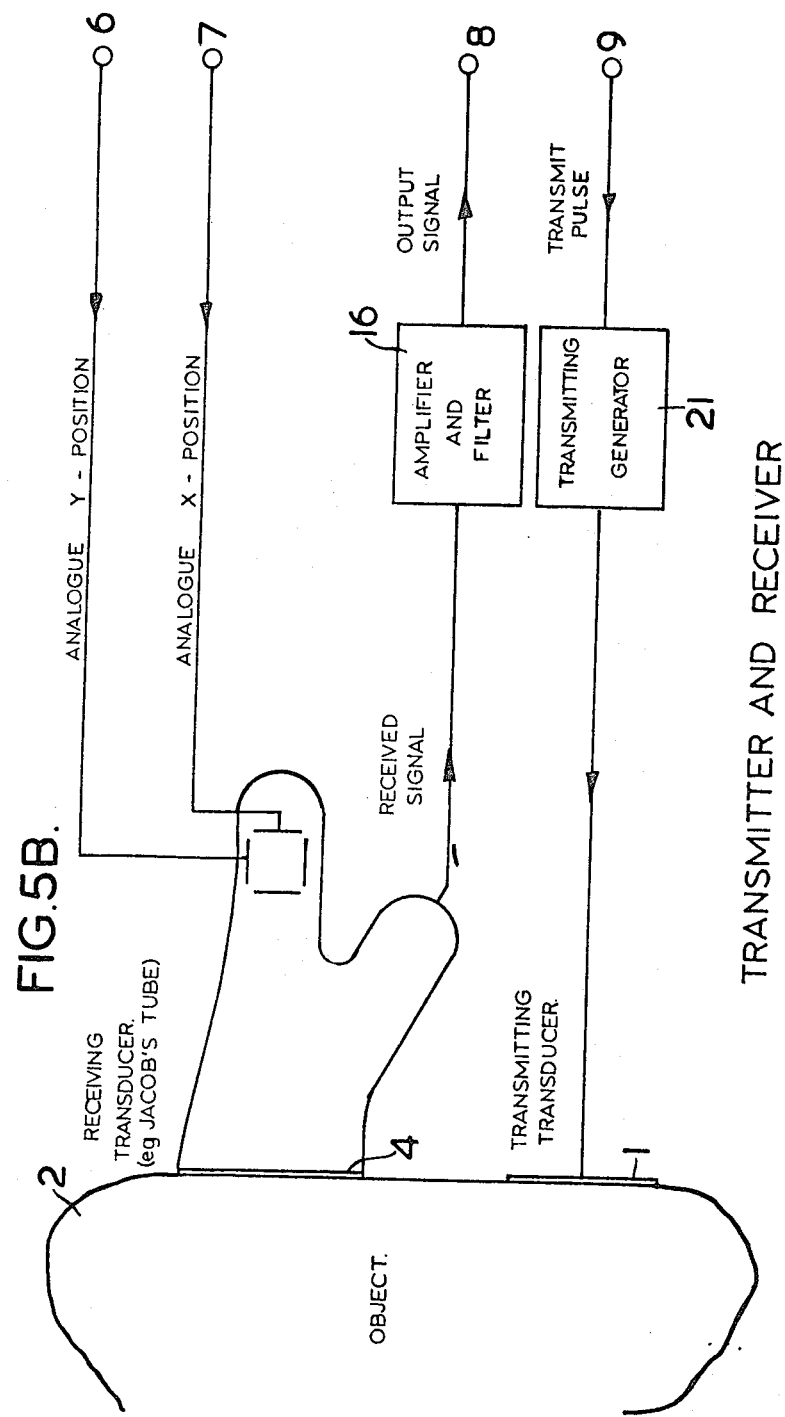

TEMPORAL SAMPLING OF RECEIVED SIGNAL.

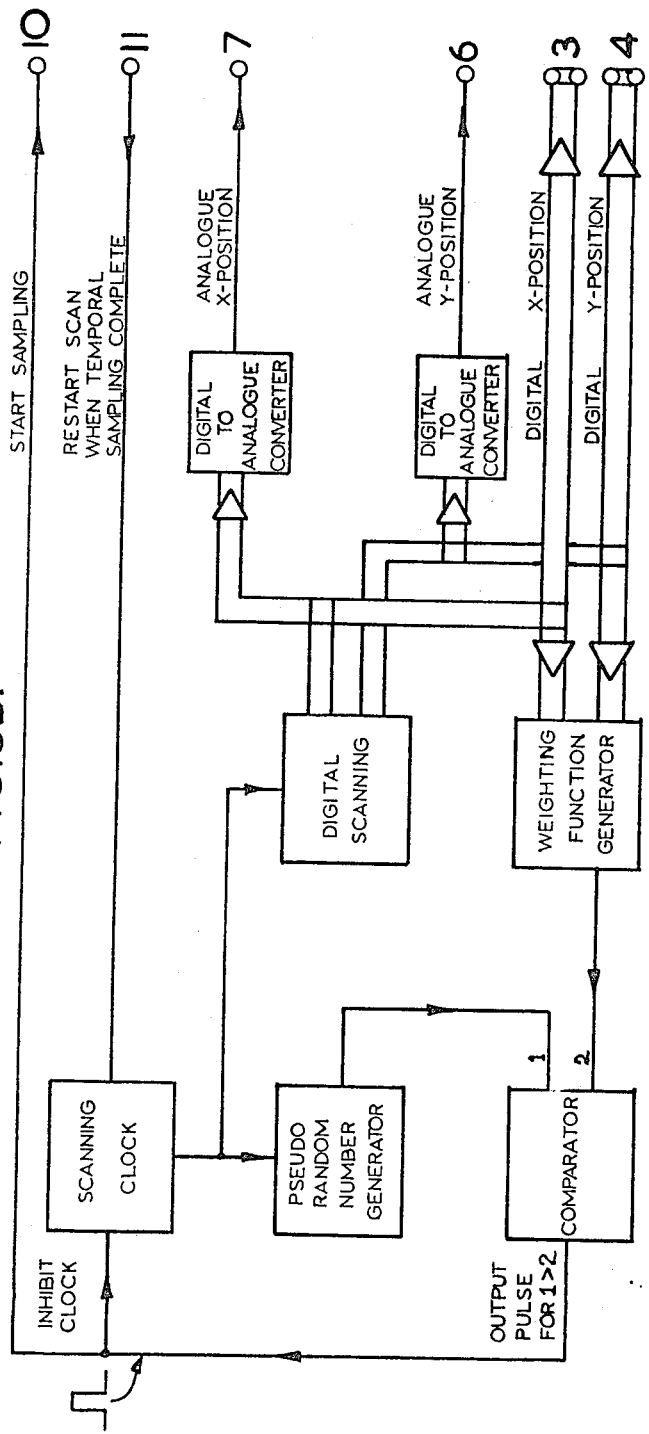
FIG.5D. RECEIVING TRANSDUCER SCANNING (INCLUDING SPATIAL SAMPLING)

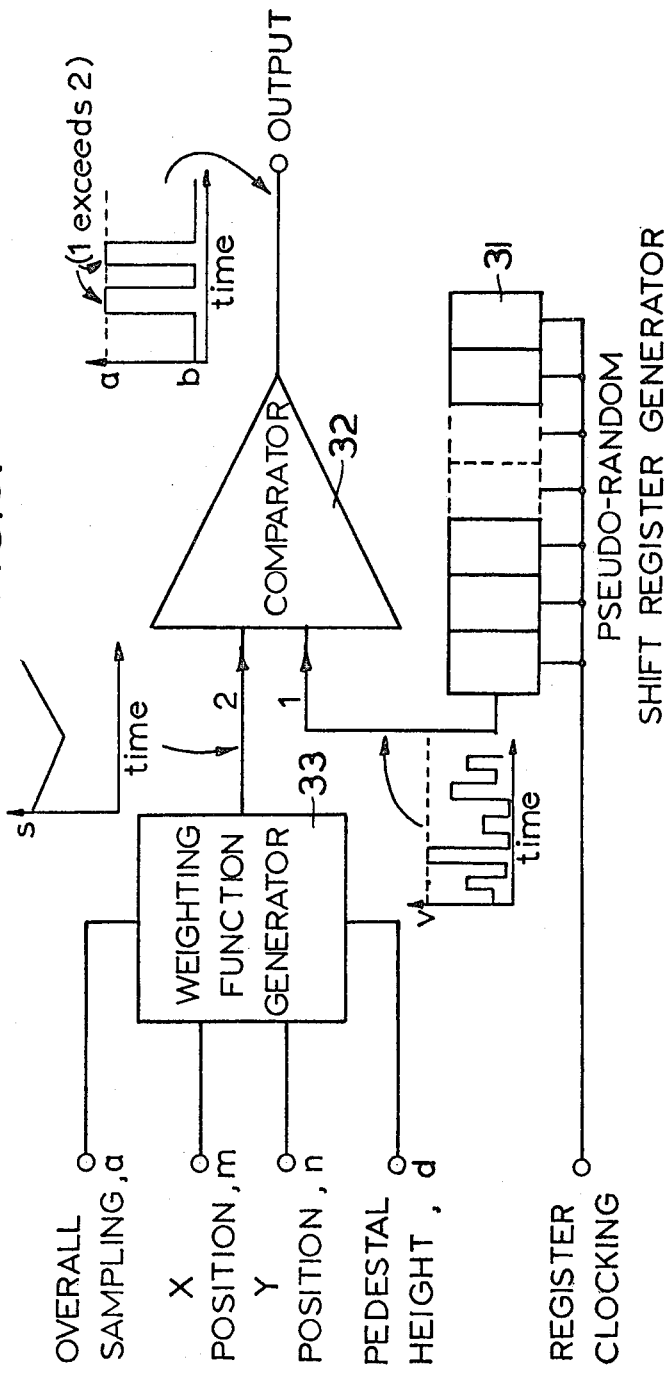

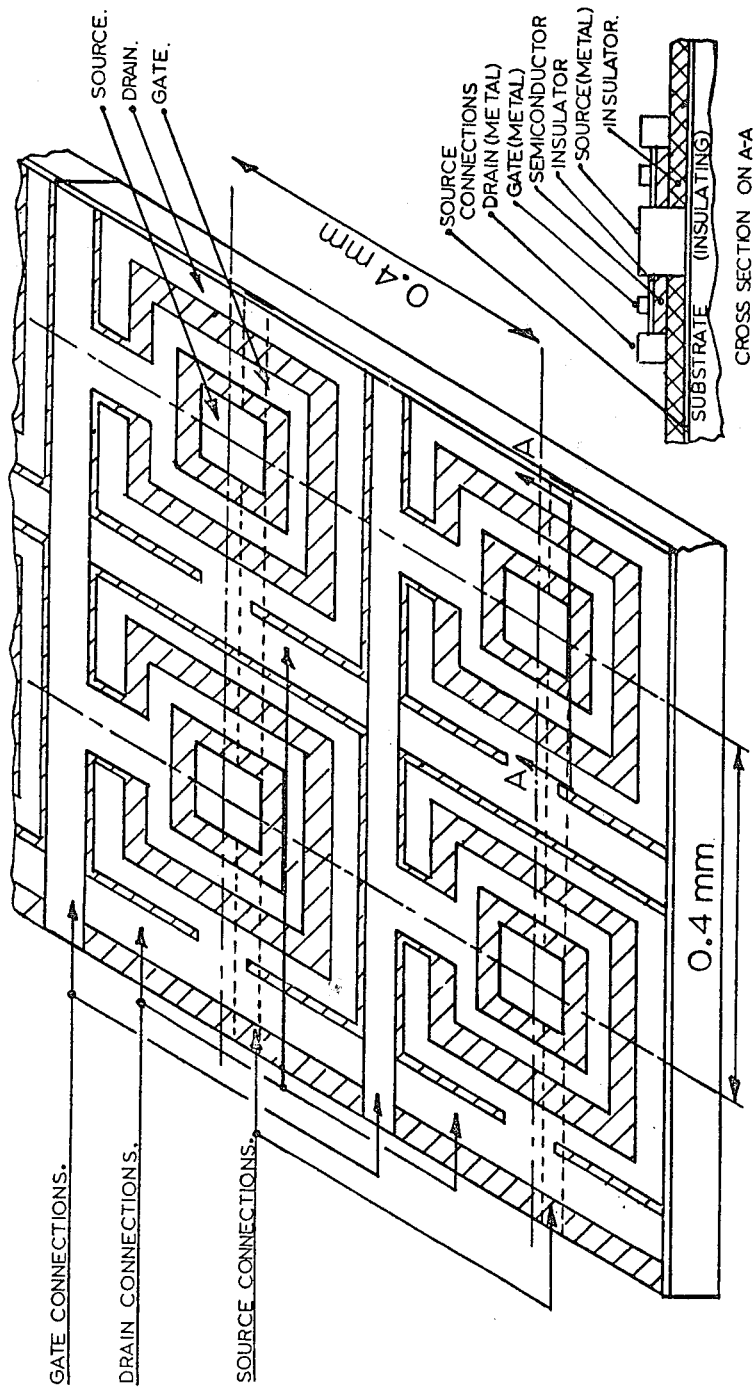

APPARATUS AND METHOD FOR IMAGES OF THE INTERIOR STRUCTURE OF SOLID OBJECTS

This invention relates to the examination of the interiors of objects by ultrasonic waves. It has particular application in examining the inside of solids or biological tissue where it is not possible to use light waves, but where high frequency ultrasonic waves can be propagated with relative ease.

The internal structure of solids and tissue has been studied by means of ultrasonic waves previously but in all cases the methods have employed single, large receiving transducers which sum the energy received over the surface of the transducer face. This usually means that the resolution possible is not less than the width of the transducer because the receiving beam formed by the transducer diverges from a width comparable to the dimensions of the transducer itself.

Some later developments have used a focused transducer whereby the beam formed by the probe (usually using an acoustic lens) is concentrated in a fixed limited region in front of the probe face; thereafter it diverges. This technique provides a higher resolution in the focused region.

To form a "picture" it is necessary to traverse the probe over the surface of the volume under examination and record the intensity of the signal on some form of three dimensional display, e.g., X, Y, plot with intensity modulation.

There are many disadvantages with such a system; direct coupling to the solid is not practicable and immersion testing is necessary. Refraction at the interfaces between the solid and the liquid together with almost complete reflection are major factors in determining the performance of the method.

According to the present invention in one aspect a method of examining the interiors of objects comprises the steps of insonifying an object to be examined, measuring ultrasonic signals from the object at a plurality of positions spaced approximately one-half wavelength apart at the highest insonifying frequency, processing the measured signals to simulate the effect of an acoustic lens, and displaying the processed signals in the form of an image.

According to the present invention in another aspect apparatus for examining the interiors of objects comprises means for insonifying an object to be examined, transducer means adapted to be coupled to the object to be examined, which transducer means has a diameter of many wavelengths of the insonifying frequency or frequency, means for measuring signals in the transducer at positions spaced approximately one-half wavelength apart of the highest frequency, means for processing said signals to simulate the effect of an acoustic lens, and display means for such processed signals.

The transducer means preferably incorporates a large (i.e. many wavelengths in diameter) single crystal transducer attached to the material under test, such that acoustic coupling to the material is high and uniform over the surface of the transducer. Means are provided for measuring and recording the signals from elemental areas of the transducer approximately one-half wavelength of the shortest apart. These independent signals are then processed electronically in such a way that the resultant information plotted on an X, Y display using intensity modulation is a replica of the signal reflection from such as a plane perpendicular to the medial axis of the transducer at a predetermined distance from the transducer, or any other chosen plane. The effect is the same as would be obtained had it been possible to place an acoustic lens at the original transducer position, between the object plane (the area being examined) and the image plane now formed by the transducer surface in a new position. The signal from each element of the transducer would be recorded on an X, Y display using intensity modulation, the object-lens-image geometry being such that the image plane was in focus.

The system resembles a camera and could be referred to as an ultrasonic camera using an electronic "lens".

the invention stems from the discovery that although the single large crystal of transducer matrix is tightly coupled to the medium under examination, elemental areas of the crystal of the order of ½ λ (of the highest frequency used in the insonification) square, vibrate independently of adjacent areas and the signal generated is a direct result of the ultrasonic energy incident on the elemental area. Samples taken with spacing of less than ½ λ are not theoretically in usual receiving situations independent and greater spacing may result in ambiguities and interference in the image. Thus across the face of the transducer there exists a complex field pattern which is a direct result of energy reradiated from discontinuities in the medium. All the information relating to the medium which it is possible to obtain through a limited aperture (determined by the transducer dimensions) is contained in the field pattern across that aperture. Because no lens is present the field pattern is meaningless. All that is required however is an electronic means for simulating a lens and then it is possible to produce a focusing image of an object on a display.

There are various ways of processing the signals to produce this effect.

In order that the invention may be more fully understood reference will now be made to the accompanying drawings in which:

FIG. 1 illustrates the invention in block diagrammatic form,

FIG. 2 is a diagram illustrating a general method of processing the received signals, FIG. 3 illustrates an embodiment of the invention, FIG. 4 illustrates an elementary direct processing system, FIG. 5A illustrates the tape punch and control logic of the receiving equipment, FIG. 5B illustrates the transmitter and receiver in more detailed form, FIG. 5C illustrates the system for temporal sampling of the received signal, FIG. 5D illustrates the system for receiving transducer scanning (including spacial sampling).

FIG. 6 illustrates the spatial sampling equipment, and

FIG. 7 illustrates basic configuration for a transducer matrix.

Figure 1:
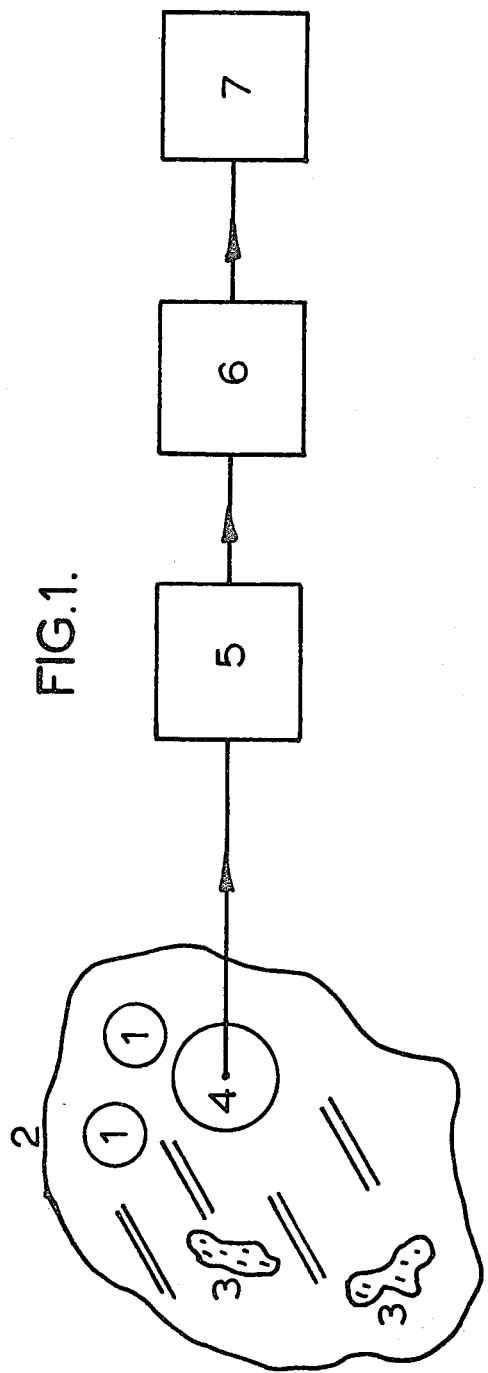

Referring now to FIG. 1 there is shown therein apparatus for examining the interiors of objects comprising one or more transmitters 1 which are mounted to insonify an object 2 under study, which object contains one or more regions such as 3 of which it is desired to obtain a picture. A LARGE DIAMETER TRANSDUCER 4 is tightly coupled to object 2 and signals received in transducer 4 at positions spaced apart a half wavelength of the highest ultrasonic frequency used are detected by means of a suitable signal acquisition means 5 and the data so obtained is processed in a processor 6 and finally is displayed in a display means 7 in the form of an image of the regions 3 in the object 2. Transducers 1 are arranged to give an approximately uniform field onto a region 3 from all directions. This preferable to insonification from one direction only when specular reflection may produce undesirable highlights Interference effects are eliminated by the use of "impulse" transmission, e.g. pulses of approximately one cycle at the resonant frequency of the receiving system. This in effect means a wide band transmission, longer pulses or continuous signals can be used, but the resultant picture will often exhibit interference patterns, and poor depth resolution.

In the case of metal objects 2 a single large crystal transducer 4 up to 100 λ (wavelength) diameter say, is closely coupled to the specimen under test by a low melting point metal or other such means. Signals from the crystal may be collected in a number of ways in the signal acquisition means.

In one method a small metal probe traversed across the back face of the crystal will collect, at the point of contact, the signal generated by the incident ultrasonic field at just that point, provided the back face is not metallized.

In one alternative method the back face of the crystal may be plated with a multiplicity of small electrically separated electrodes to which contact is made by a corresponding number of wires or by one or more movable contacts. This method is more particularly suited to transducer materials of high relative permittivity. The above two methods may be used in principle but are slow.

In yet another method by scanning the back face with an electron beam and collecting the secondary emission. For this purpose the transducer crystal must form part of a high vacuum tube similar in principle to the image orthicon tube used in television cameras.

Another method is to form the transducer itself of a matrix of pressure sensitive semi-conductor devices forming a large surface and switched so that any $X_m$ row and $Y_n$ column may be used to obtain the signal at point $X_m Y_n$. This method will be described in more detail later. Both the immediately above methods can be applied to metals and to tissues.

Having obtained signals from elemental areas of the transducer 4 the acquired signals are then processed in a processor 6. One method of operation of processor 6 is to consider the formation of a focused receiving beam which can be scanned in two directions so as to examine the required area. The signal from each elemental area of the transducer can be delayed according to the position of the element before being combined with adjacent elements so as to produce the effect of a concave receiving surface. This would produce a focus at a region determined by the radius of curvature. Before combination with signals from adjacent elements, the signal could additionally be delayed by an amount according to the position of the element to produce the effect of tilting the surface, thereby deflecting the focus off the axis by a predetermined amount. The focus could then be scanned so as to examine the detail the area under investigation.

Figure 2:
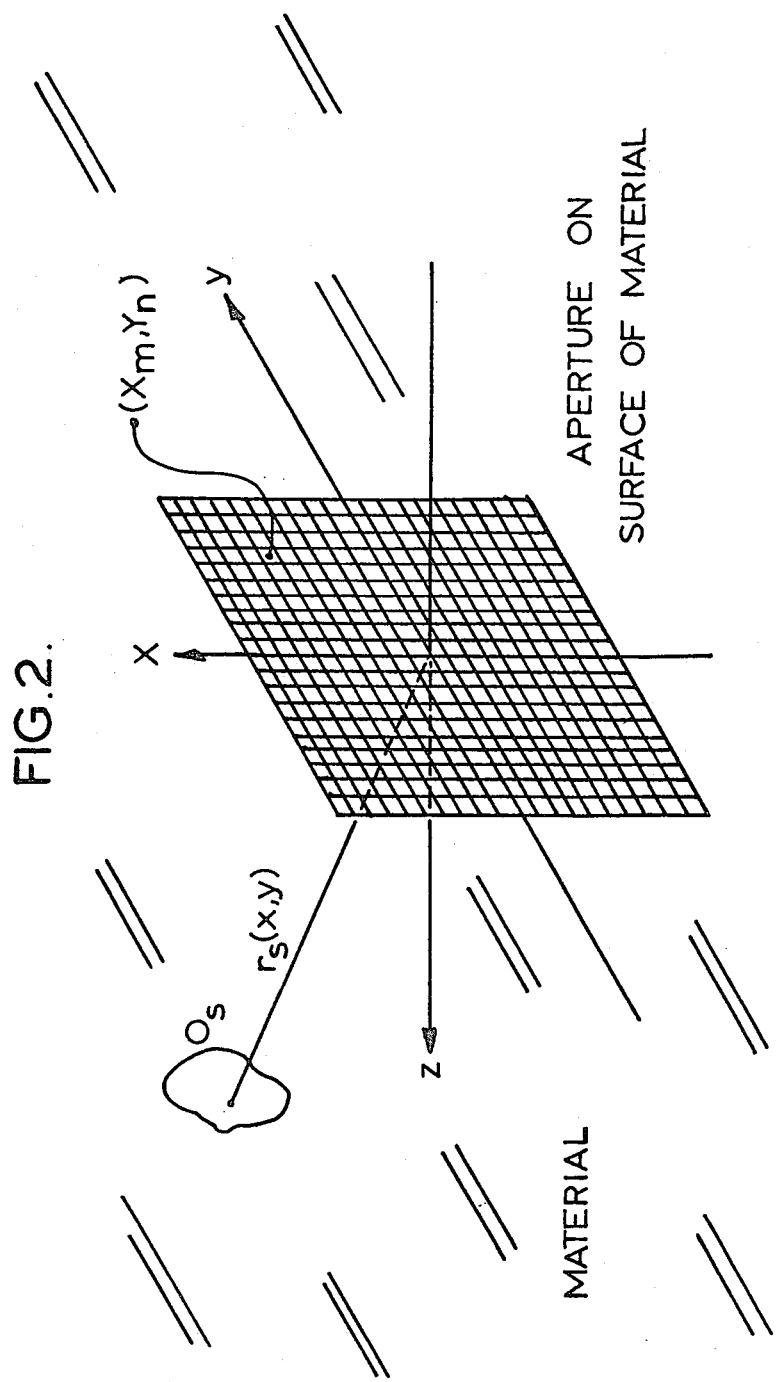

A more general method — of which the one just described can be considered a special example — uses a more sophisticated approach, which is however more practical. FIG. 2 shows the configuration of the medium and the aperture through which it is viewed. Consider the signal at $X_m Y_n$ of the aperture to be producing spherical waves radiating out into the medium. These waves will in due course pass through the region containing object $0_s$. The sum of the waves at $0_s$ from all $X_m Y_n$ will, if radiated with delays which are the complement in time to the received delays produced by the space geometry, produce a field pattern which is, within the limits imposed by the aperture size, exactly the same as the original field disturbance caused by the object $0_s$. Such an effect can be simulated in a "computational space" where the signals are summed after they have experienced the delays computed from the real space geometry. A plot of the sum of the signals for each elemental region of the object space will produce the field pattern caused by the space disturbance. This then is an acoustical representation of space and is analogous to an optical representation of space since the plot will be a function of the reflecting properties of the spatial disturbance, defects etc. The degree of resolution will as in the case of optics be a function of the dimensions of the aperture in terms of wavelength and of he bandwidth of the "illuminating" signal used.

The reconstruction process may be undertaken in other ways. For example the signals recorded from the receiving aperture of the system may be analyzed into a set of equivalent plane wavefronts impinging on the aperture and this set used in constructing the representation of space. This particular method has the practical advantage of being representable as a multidimensional Fourier transform operation. The actual implementation of Fourier transform operations has been rendered much more efficient by recently developed methods.

Figure 3:
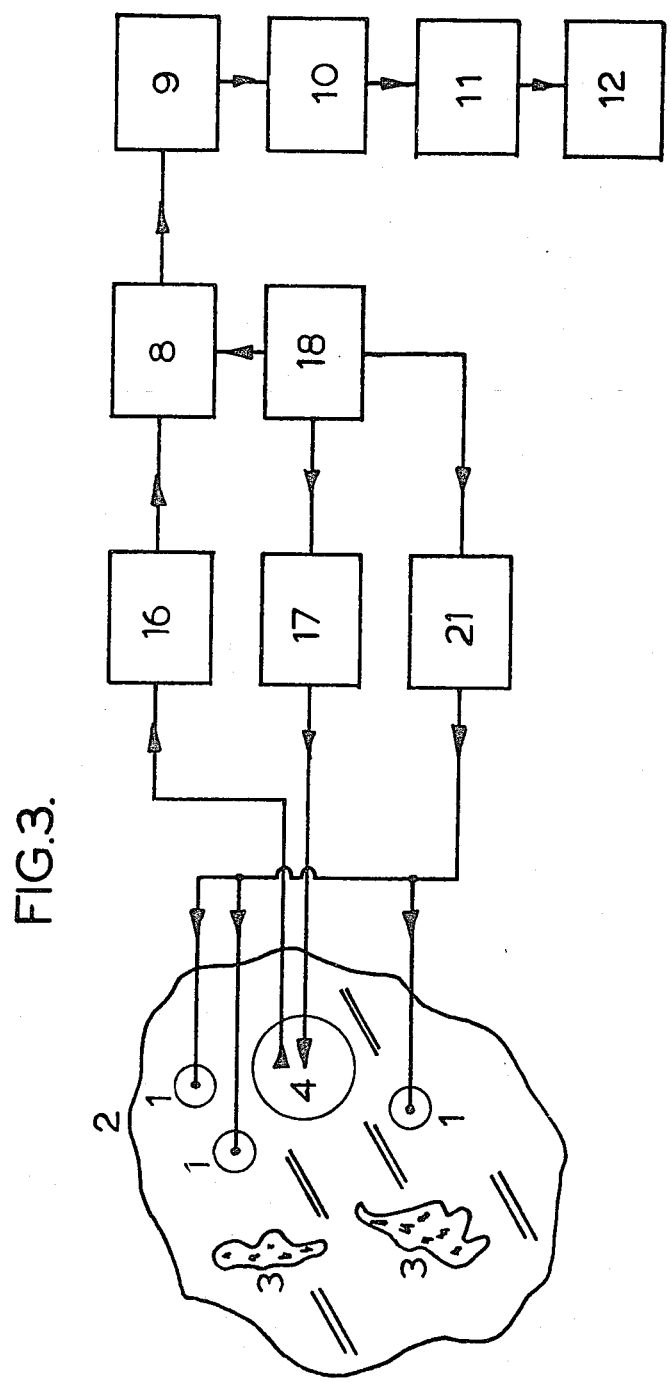

FIG. 3 illustrates apparatus embodying the invention in a more detailed form and like parts have like reference numerals to the basic configuration illustrated in FIG. 1. The means for insonifying the object 2 to be examined comprises a plurality of transmitting transducers 1 secured to object 2. These transmitters consist of one or more standard sections bonded either directly to the material of object 2 or with intermediate layers of material to improve the spatial diffusion of the acoustic field. Suitable intermediate layers may consist of metals of large grain size, for example cast-iron and nimonic alloys. The transmitting transducers 1 are energized by means of a suitable signal generator 21 which generates a signal at a suitable frequency or band of frequencies as determined by the loss characteristics of the material being examined and the resolution desired. Typical values are in the range 1 megaHertz to 100 Megahertz. Generator 21 is controlled by means of a controller 18 which synchronizes the timing and the phasing of the signals from generator 21 to control signals from the receiving and recording apparatus described below.

The excitation may variously consist of short pulses of a bandwidth compatible with the spatial and temporal sampling characteristics of the receiving apparatus; bursts of tone consisting of many (e.g. 10 – several hundred say) cycles of a frequency normally but not necessarily that of the half wavelength of the transmitting and or receiving transducers; or continuous transmission. The first type of transmission provides greater information about the material but the second is convenient for experimental evaluations with simple apparatus as essentially only a single frequency is significant. The third type of transmission is suitable only for materials of very large extent or high attenuation where standing wave patterns set up by reflections from the boundaries are very weak. The production of transmitters for these various waveforms and with the required synchronization is standard technique. For a guide, with the first type of transmission peak pulse power of the order of 100 watts is suitable for depths of up to the order of 1 meter in many metals.

Signals reflected from regions such as regions 3 in object 2 are received by receiving transducer 4 which has a diameter which is a large number of wavelengths of the insonifying signal. The surface of transducer 4 is interrogated by means of a scanner 17 at positions spaced approximately half a wavelength from each other. The output signals from transducer 4 as controlled by scanner 17 are amplified and filtered in an amplifier 16 and then stored in a storage device 8 from which they are fed to a processor 9 in which the signals are processed to simulate the effect of an acoustic lens. The output of the signals processed in processor 9 can then be displayed in a display device 10 and if desired parts of the display can be enhanced in an enhancer 11 and finally displayed in another display arrangement 12. A synchronization and control device 18 controls the operation of generator 21, scanner 17 and storage device 8. The three main stages of the receiving transducer 4 the scanner 17 and the processor 9 are to some extent interdependent and several overall configurations are possible. Choices made will determine whether the system may record moving, or only stationary and very slow moving objects; the time taken to obtain a display; the volume of the material that may be examined with the one set of measurements and the complexity and, or quantity of apparatus required.

Figure 4:
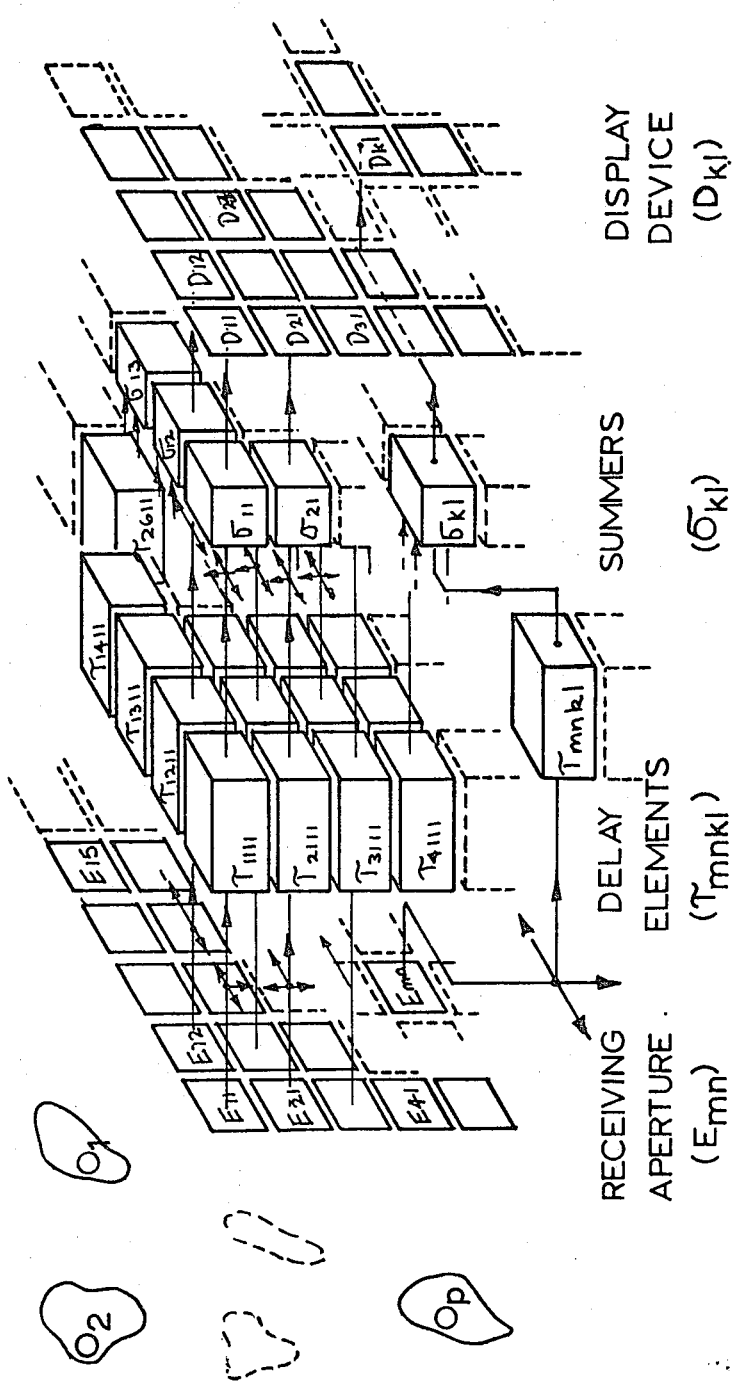
Figure 5A:
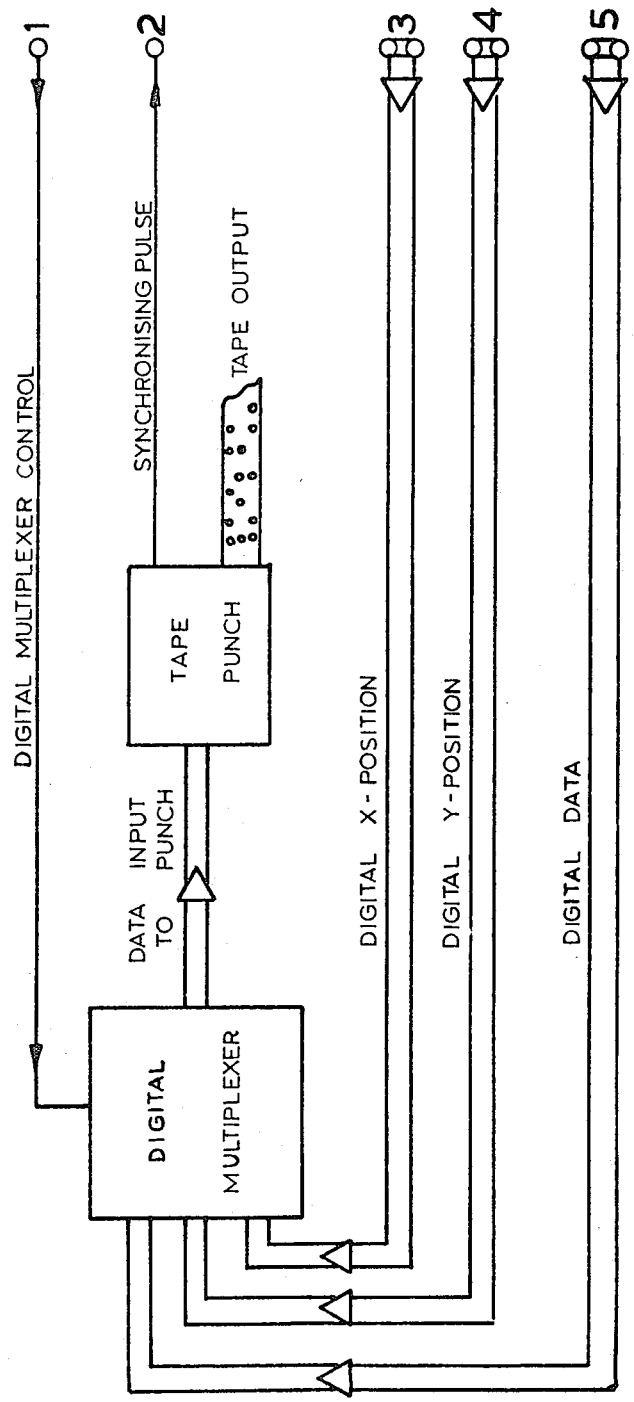
Figure 5C:
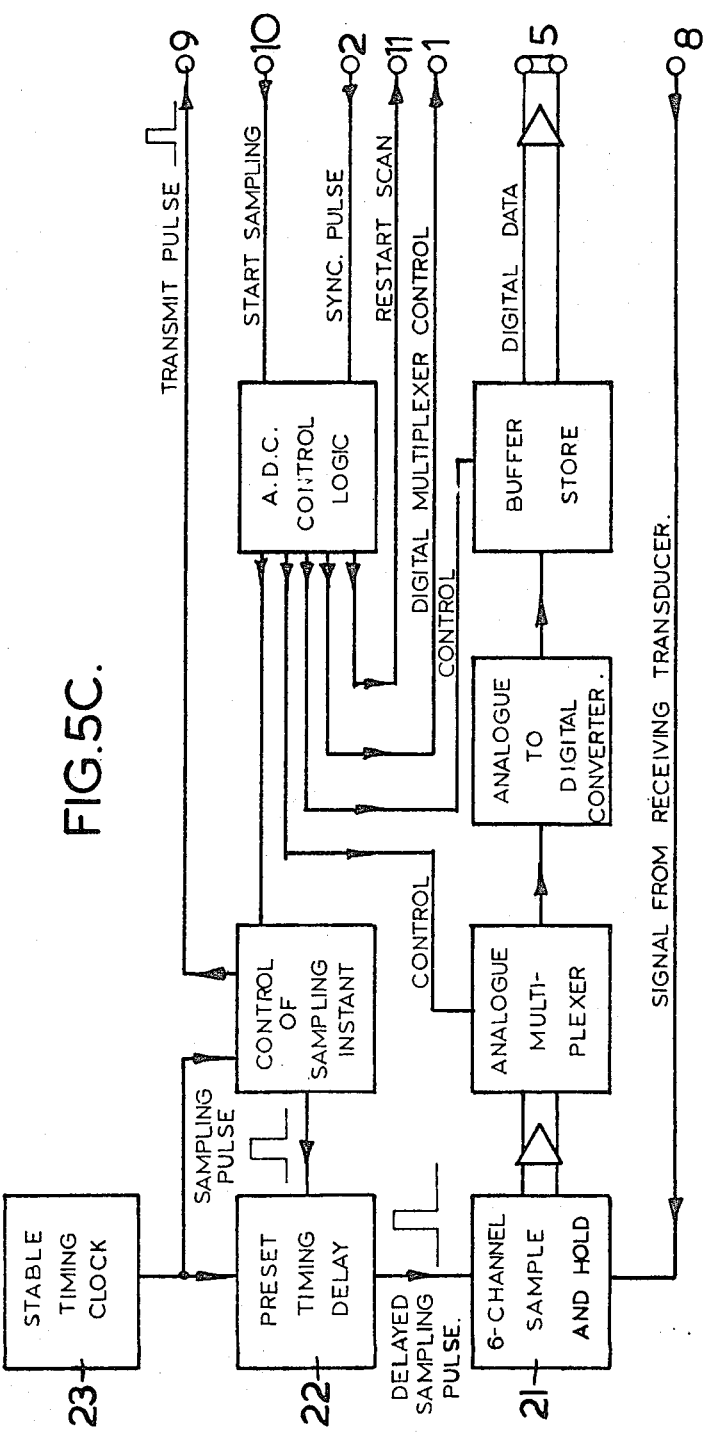

Consider first the most conceptually basic method, which is illustrated in FIG. 4. The receiving surface consists of a number of independent elements $E_{mn}$ to which independent contact is made. The signals scattered off various objects such as $0_p$ are received on the $E_{mn}$ and the transduced signals fed to a set of delay devices $\tau$ one from each receiver to a summing device $\sigma_{kl}$ the output of which is presented on element $D_{kl}$ of the display. The delay between receiver $E_{mn}$ and $\sigma_{kl}$ is denoted as $\tau_{mnkl}$. For N receiving elements and M display and summing elements, there will be N×M such delays. Each $\tau_{mnkl}$ for a given $kl$ is chosen such that the reradiated energy that left some particular spot in the medium at a given instant and was received on $E_{mn}$ arrives in its transduced form at $\sigma_{kl}$ simultaneously with that received on all the other E's. Thus if there was reflection of the insonifying signal from this spot the summation will have a large magnitude, while if no such reflection occured then in general only small random output will result. The complete set of $\tau_{mnkl}$ would normally be chosen to image a surface inside the material corresponding to the physical shape of the display. This would typically be an area out of a "-slice" through the material. The insonification waveform may be of any of the types mentioned above as appropriate to the circumstances.

If means are provided for altering the values of the $\tau_{mnkl}$ then the displayed region may be scanned through the volume of the material. Movement of the $O_p$ relative to the $E_{mn}$ is accommodated and will, within any limitation of the display response, be correctly indicated.

This most basic form of processing device, conforming most directly to the focusing action of a lens, is impractical because of, (1) simultaneous connection to all elements of the receiving array; (2) very large number of delay elements required. (M and N will be of the order of 1,000 each at least); (3) control of the $\tau_{mnkl}$ for variable focus. The values required are in general non-linear functions of the positions of $E_{mn}$ and $D_{kl}$.

Reduction to a practicable device has proceeded along the following lines:

If the transmitter, object and receiving array maintain fixed relative spatial positions then the acoustic field across the receiving array will be time stationary. This removes the need for simultaneous access to all the receiving elements. A section of the total signal return to each element E is recorded and appropriate delays and summations applied to this ensemble of signals either physically or computationally to produce the signals for each display element $D_{kl}$. The entire space cannot now be imaged from one set of readings from the elements $E_{mn}$ except in the case of a C.W. transmission where the recording from each element $E_{mn}$ merely consists of two values representing phase and amplitude. Recording a section at a suitable time after the instant of transmission defines approximately a particular volume under examination. Position is determined by the time waited and extent by the length of sample recorded.

With these restrictions, the elements $E_{mn}$ may now be addressed in sequence over a period of time by methods such as those described below. Further, not all required length of signal from each element E need be recorded on any one transmission. This is particularly convenient when the insonification contains high frequencies in simplifying the recording process.

The period required to obtain all the data from the elements $E_{mn}$ is now determined by the speed of the recording device and the time taken for the reverberation from the previous transmission to decay. This latter may extend to several milliseconds.

Alternatively not all the possible elements $E_{mn}$ need be examined. A relatively small random sample of the total number enormously reduces the bulk of data to be collected with a proportionally much smaller and statistically predictable degredation in image fidelity. At the expense of some loss in resolution but an easing in processing requirements, further reduction in the number of spatial samples may be obtained by application of a space tapering function to the aperture simultaneously with the random sampling scheme. This tapering is achieved by the selection, on the average of a fraction of the total $E_{mn}$ in a given area of the array, proportional to the value of the tapering function over this area. Means for accomplishing this are described below.

The means for performing the desired image construction operation on the ensemble of received signals are in two main categories:

a. the complete ensemble of received signals may be stored within the apparatus and the processing performed by special "hardwired" operations in an integral computing device.

b. No processing beyond the preliminary spatial and temporal sampling of the signals is done directly; the signals are transferred via a suitable intermediate medium (e.g., magnetic tape, paper tape) or directly into the storage of a digital computer programmed to perform the necessary computations.

Displays may be variously generated on graphic display devices, or on a line printer. Suitable hardware to accomplish these methods is described below.

The set of data generated for the display device 10 ($D_{kl}$ in FIG. 4) may be further processed for example to enhance the information content and recognize automatically certain types and combinations of object shapes and patterns. Devices 11 and 12 for achieving this are known. These supplementary operations may be performed using digital computer programs or by the use of optical processing techniques.

The scanner means 17 for scanning the transducer array appropriate to the type of transducer employed and producing signals giving the position of the element $E_{mn}$ under examination at each time may take various forms. One type may be addressed by means of a manually or automatically scanned X, Y traversing mechanism with means (Such as reading a calibrated scale, mechanically linked potentiometer etc) for recording position.

Another type requires the use of suitable controlled voltage or current supplies as appropriate for electrostatic or magnetic deflection of the electron beam respectively. These may most conveniently be generated by the conversion to analogue form of two digital signals representing the X and Y positions respectively as this then provides a signal in the form (digital) most suited to the recording and computer processing parts of the overall system. This method of scanning a cathode ray tube is well established in graphic output displays for computers.

Yet another type may be scanned by the incorporation of two shift registers, each consisting of a number of stages equal to the number of element rows in the direction being scanned. Propagation of "turn on" signals through the registers in response to an applied signal successively selects each row $m$ and each element $n$ of the row in sequence. These shift registers may be incorporated on the same substrate as used to form the transducer elements or be physically distinct. This method of scanning is embodied in existing devices comprising light sensitive arrays of semiconductor devices.

Amplifying means 16 as appropriate to the type of transducer and the signal characteristics employed to bring the signal output from the transducer to a level suitable for the succeeding circuitry are provided. Additionally, the signal may be subjected to filtering operations for the purpose of restricting the bandwidth to a figure suited to the temporal sampling rate of the system; or for the purpose of compensating for distortions introduced into the signal by transducer characteristics. This filter may take the form of a simple low pass or bandpass filter, or be of the matched filter configuration. This latter type may be realized in either analogue or digital forms. From here on the operations performed depend on the exact type of system being followed.

Conversion of the analogue signal to digital form is required where digital processing is carried out. Sampling in time must be done at a rate determined by the Nyquist criteria to avoid error. Amplitude quantization may be done to any number of levels. Typically the prevailing signal to noise ratio in the system will make four levels (two bits) appropriate.

This quantization may be accomplished in several ways. The number of temporal samples taken on each repetition of the insonifying signal may be varied arbitrarily. If for example, the signal has a bandwidth of 12 MHz and 10 microseconds of signal are recorded from each of the sampled $E_{mn}$, then a minimum of 240 samples is required. These may be obtained, say, six at a time in a six channel sample and hold circuit 24 and the samples stored in a temporary store comprising two shift registers (one for each bit of amplitude information) each six units long. This number is particularly convenient if paper tape is used to transfer the information to a separate computer as the typical time to punch this amount of data is comparable with the time needed between transmission for reverberation to decay. Transference of data to a higher speed medium such as magnetic tape makes capture of more information from each transmission feasible, greatly decreasing total recording time. Transference of data to the temporary storage shift register may be done directly on quantization by clocking the register at the sampling speed or indirectly through sample and hold circuits for each of the samples taken. The samples are later quantized and passed into the shift registers at a rate the same or more usually much slower than the original sampling. The signals stored in the shaft register stages are encoded into a form suitable for transfer onto the medium used for transfer to the computer. This type of operation is well established practice.

Take the example of eight track paper tape. As well as the signal, recorded information must be provided identifying the element $E_{mn}$ from where it came. This is most conveniently accomplished by first punching two seven bit (say, giving up to 128 × 128 E's) numbers representing $m$ and $n$ and then, for two bit quantization and 240 samples, 80 six bit punchings each representing the data of 3 successive samples. Additionally an extra track may need to be punched each time to satisfy the condition that at least one track on the tape must be used. The six data bits may be on tracks one to six and the extra bit on track eight, this additionally differentiating between the data and positional information.

A similar arrangement may be followed on multiple track magnetic tape, or the entire arrangement altered to suit some particular coding for the digital machine employed.

So far it has been implicitly assumed that the operation involved was direct transference of sections of the signals on the elements $E_{mn}$ to a digital computer. It now remains to describe the means for choosing the correct section of the total return following a transmission, the method of obtaining a suitable random sampling of the elements $E_{mn}$, and means for correctly sequencing the various steps. To this end an initial selection must be made of the general region to be imaged in the material. Knowledge of the approximate relative position of the transmitter(s), region of interest and receiving array together with the propagation velocity of the mode of wave propagation used (most commonly longitudinal) enables a simple calculation to be made of the delay from the instant of transmission to the arrival of the reradiated signals (if any) from this region at the various $E_{mn}$. The precision to which this calculation need be made depends on the amount of storage provided for the signal from each $E_{mn}$. Generous storage enables either a large region to be examined, or greater uncertainty to exist in the positions of the various parts. (Ultimately, infinite storage or the provision of a completely "parallel" processing scheme (e.g. the basic scheme of FIG. 4) removes any need for this calculation).

The time so calculated is set up by arrangement of a simple scaling circuit fed from a timing pulse source 22 to provide an output when a count corresponding to the time is reached. Counting is initiated in a timing delay 23 from a zero state at the instant of transmission and on the preset count being reach read in of data to the temporary storage of circuit 24 is commenced.

By this means all the sets of data from each $E_{mn}$ taken have a common time reference and hence are equivalent (in a system where no relative movement occurs) to the ensemble obtainable by simultaneous recording from all the $E_{mn}$ after a single transmission.

The timing pulse source may conveniently but not necessarily be derived from the same source as used to provide sampling pulses. The prime requirement is stability. If a criterion is that the error over the maximum path length of say 600 mm should not exceed one-sixteenth of the shortest wavelength then a stability of 1 in $10^4$ is needed. This is easily achieved with simple oscillators.

Spatial sampling and space tapering is achieved by combining, (a) a random signal generator 31, (b) comparator 32, and (c) weighting function generator 33, as shown in FIG. 6. A suitably random signal is obtained from pseudo random shift register generator 31. This has the advantage of providing a sequence, which, while having statistically random properties is repeatable with a definite period. In the present instant the period is made equal or larger than the total possible points, $E_{mn}$ (approximately 17,000 for an array of 128 by 128 points). Input to the shift register generator is provided from the same source as is used to increment the scanning of the array. The output of these devices may be arranged to provide a uniform probability of all possible states lying between say 0 and V volts. This signal is now compared with a signal (S) set to a value in the range 0–V determined by the percentage sample required and the desired aperture weighting function. If the random signal (say) exceeds S then one output state (A) will be generated while if less than S, state (B). Suitable devices to perform this comparison function are available as integrated units. The output state of the comparator 32 is used to control whether or not a set of data will be recorded from the $E_{mn}$ being addressed at that time. If say S is fixed at 0.9 V then approximately 10 percent of all possible $E_{mn}$ will be sampled. Similarly for other values of S.

If further S is made to vary the density of sampling may be varied over the $E_{mn}$'s. This forms the basis of the space tapering.

S is generated from three inputs, (a) a level, preset externally and held constant over any one complete scan of $E_{mn}$'s, (b) a signal representing the value of $m$, (c) a signal representing the value of $n$. These are combined using, for example, a resistance-diode function generator to give say a "cone on a pedestal" function.

$$S = \frac{d + \sqrt{m^2 + n^2}}{a} \qquad 1$$

$a$ is proportional to the overall sampling density.

$d$ is a constant defining the pedestal height, which may be preset.

$m$, $n$ represent the array position.

With the assumption above that increased S results in a smaller sample being taken the weighting function is inverted to obtain correct operation. It will readily be seen that this type of function generator can suit circular or other shapes of arrays by defining the weighting function as zero over the "corner" regions of the basic square grid.

The control action taken on generation of state B consists of inhibition of the transmitter and immediate advance to the next $E_{mn}$ and next state of the random signal. Generation of state A causes the data capture operation detailed above to commence.

There are several methods of achieving suitable synchronization of the various operations:

a. control "ring counter" clocked at a rate determined by the speed of the data recording device, switching on appropriate sections of the apparatus in response to signals from the items described, b. individual control of each section with operations transferred directly on to the next section at appropriate times.

Suitable means of achieving a control function of type (a) consists of switching in the following sequence.

i. Increment $m$, $n$ by one element, simultaneously advancing the random signal generator. Examine output state of comparator, if state B, return counter to previous reset state and repeat. If A, then step on to (ii) below.

ii. Send out insonifying signal, simultaneously commencing a timing count as described above. Increment ring counter to state (iii) on receipt of synchronzation information from data recording device indicating completion of recording.

iii. If all data from a given $E_{mn}$ is recorded on one transmission, this constitutes a "reset" operation. Temporary storage register and the timing scalers are cleared, control stepped onto operation (i).

Alternatively, if several transmissions are made at each sampled $E_{mn}$ step (iii) and any further number required are a repetition of (ii), finally returned through a reset position as in (iii) to state (i).

Suitable means for control of type (b) (which is the style actually employed) consists of:

i. In the absence of any other operation the $m$, $n$ and random generator are continuously advanced by a timing source which may be of fixed or variable frequency. This frequency may be above that which sections of the complete scanning circuitry are able to follow, provided only that a correct count of the $m$, $n$ values is maintained. For example, for electrostatic scanning of a conversion tube, reed relays are suitable devices to handle the voltages involved (100 – 300 volts). These have restricted speed of response but the control circuitry driving them will typically be several orders of magnitude faster.

ii. On generation of state A from the spatial sampling circuitry the array position just reached is held. This may be achieved by feeding the timing source pulses through an AND gate with the output of the comparator.

iii. The data recording device is assumed to be continuously producing timing pulses synchronized to its recording cycle. The first one of these arriving after (ii) above starts insonification and the timing count to the beginning of recording from the addressed $E_{mn}$. This may be done by ANDing the synchronization pulse with the State A and further with a fixed position on the waveform of the timing clock described above. This latter synchronization assists in minimizing the effect of cumulative drift in the timing.

iv. Reception of the data from $E_{mn}$ is completed and this transferred to the recording medium on the command of its next synchronization pulse or pulses as appropriate. Completion of recording may be sensed by accumulating a count of synchronization pulses and producing an output on reaching the required number. This transfers the recorder inputs to the $m$ and $n$ value counters in sequence. This type of multiplexing operation is well established. A special record indicating the end of a section of data may be inserted at this stage and control then transferred back to (i) above.

The mathematical operation to be performed to compute an image is:

$$R_{kl} = \Sigma_{m,n} U_{mn} F_{mnkl} \quad (2)$$

where $R_{kl}$ is the signal to be displayed at $D_{kl}$.

$U_{mn}$ the set of data from $E_{mn}$ as obtained by the means described above.

$F_{mnkl}$ the operation to be performed to represent the effects of the $\tau_{mnkl}$.

The summation corresponds to the $\sigma_{kl}$ operation in FIG. 3. Consider a particular simple case of:

C.W. insonification.

The time delay operation reduces to a phase shifting and in the usual notation (dropping the $e^{j\omega t}$ term).

$$F_{mnkl} = W \exp\left(-j \frac{2\pi}{\lambda} d_{mnkl}\right)$$

where $d_{mnkl}$ is the distance expressed in the same units as the wavelength between the array point $m, n$ and the position in the medium corresponding to the $kl$ position in the image. $W$ represents any further function applied, and typically is a function of $d$ representing the spherical spreading of the wavefront. $U_{mn}$ is in complex (phase, amplitude) form, and $R_{kl}$ will be a complex function. For display this must be represented as a single dimensioned quality. Typically the modulus or some simple function of this (e.g. square, logarithm) is taken.

The alternative method mentioned previously may also be implemented. In this case the Fourier transform of $U_{mn}$ is taken. This may be achieved most efficiently by use of an algorithm of the Cooley-Tukey type, producing complex numbers representing the phase and amplitude of the various angular components of the field pattern. These are then summed with phase shifts corresponding to $d$ as before to give the values of $R_{kl}$.

In the case of wideband signals a convenient approach consists of first analyzing the recorded waveforms from $E_{mn}$ into Fourier components producing a set of complex functions, one member for each frequency. Each of these members may then be treated as above and the results superimposed to produce a final value for $R_{kl}$. In the case of discontinuous insonification only a range of $d_{mnkl}$ corresponds to imageable regions of the space. The computer program must make provision to accept data as to the range allowable. The precise details of implementation of this processing are dependent on the type of programming language used and the physical details of the particular computing installation, but a prime requirement is a machine of fairly high speed to cope with the very large number of operations in reasonable time.

Image enhancement and recognition schemes may be most readily performed on the $R_{kl}$ data which is retained in the computer store.

In alternative realizations the computing device is coupled directly to control the receiving apparatus which differs from that previously described by a. omission of the data recording medium in the form described above. Values of $R_{kl}$ are now accumulated directly.

b. The temporary storage after the analogue to digital conversion on the incoming signals from the $E_{mn}$'s is elaborated to allow the shifting of the data in either direction along the storage and to control this shifting by computer generated signals.

c. The timing of the instant of reception of the incoming signals may be made variable. This is easily realized by a set of gates on the timing scaler.

Operation now proceeds as for the previous system except that on the generation of an "A" state, control transfers to the control computer which, from a knowledge of the transmitter location computes an "average" value of time delay from the transmitter to the region to be imaged and to this adds in each particular case a computed value of the appropriate $d_{mnkl}$. This information is used to set up the scaler so that the received signal will arrive at the temporary storage with the various samples in predetermined positions relative to where all the others received were stored. (These positions were fixed previously). If the scaler counts at increments equal to the temporal sampling interval then this is all that is needed. If less then the nearest value obtainable to the correct delay is taken and the samples clocked along the temporary store by the appropriate number of locations after reception.

These samples are then transferred to an equal or less number of accumulating counters (some samples may be omitted), one counter for each temporal sample going to form each $R_{kl}$. Thus after all $E_{mn}$ have been interrogated for all $D_{kl}$ one has a series of samples corresponding to the desired $R_{kl}$.

This process may be elaborated by retaining the one reading from the $E_{mn}$ and shifting it back and forth along the temporary shift register store to appropriate positions to "align" the stored signal with the appropriate storage counters for the consecutive $kl$ values. This is then similar to the method described above, in which the one set of data from a given $E_{mn}$ is used for all $D_{kl}$.

The essential uniqueness of the whole system lies in the combination of the gathering of highly detailed spatial and temporal information on the acoustic field distribution over the surface of the material examined with the complete utilization of this information to produce detailed, controllable images of the acoustic representation of the material approaching closely to the resolution theoretically obtainable.

FIG. 7 illustrates a basic configuration for an addressable solid state transducer array which can act as a receiving transducer 4. This array is a combination of two developments. The first is the production of matrices of photosensitive semiconductors arranged with connecting leads such that the electrical switching abilities of the photosensitive transistors permit one only at a time to be activated by application of suitable signal,. The addressing principle is similar to the methods used in magnetic core storage arrays.

The second development consists in exploiting the piezoelectric properties of cadmium sulphide or other suitable material (e.g. gallium arsenide). The material is used to form the channel region of a field effect transistor structure. Application of acoustical energy causes corresponding electrical charges to be developed by the piezoelectric properties of the CdS. This charge then modulates the source to drain current of the transistor in exactly the same way as applied charge controls this current in a normal transistor.

The combination of these two techniques produces the device referred to in this application, giving a large array of transducer elements, individually addressable with a minimal number of external connections. A P by Q element array needs only P + Q external connections compared with P times Q for transducers such as those described as types 1 and 2.

We claim:

1. A method of examining the interiors of solids or biological tissue comprising the steps of:

insonifying an object to be examined with ultrasonic energy comprising at least one predetermined frequency component, measuring a multiplicity of reflected ultrasonic signals from the object at a plurality of correlated positions spaced approximately one-half wavelength apart at the highest useable insonifying frequency component substantially in a plane approximately parallel to an area under inspection, processing the measured multiplicity of signals to electrically simulate the effect of an acoustic lens with the processed signals by effectively producing selective time delays and summations of the multiplicity of signals to selectively "focus" upon a plurality of elemental areas in the interior of the object, and displaying the processed signals in the form of a visual image whereby a focussed image of the whole of said area under inspection is formed by coherently displaying the result of said effectively produced time delays and summations for the plurality of elemental areas said display of elemental areas having the same relative correlation as said correlated positions.

2. Apparatus for examining the interiors of objects comprising:

means for insonifying an object to be examined with ultrasonic energy comprising at least one predetermined frequency component, transducer means for coupling to the object to be examined, which transducer means has a diameter of many wavelengths of the highest useable insonifying frequencies, means for scanning, labeling and measuring a multiplicity of received signals in the transducer at correlated positions spaced approximately one-half wave-length apart at the highest useable insonifying frequency substantially in a plane approximately parallel to an area under inspection, means for electrically processing said multiplicity of signals to simulate the effect of an acoustic lens with the processed signals by effectively producing selective time delays and summations of the multiplicity of signals to selectively "focus" upon a plurality of elemental areas in the interior of said object, and display means for displaying a visual image from such processed signals whereby a focussed image of the whole of said area under inspection is formed by coherently displaying the result of said effectively produced time delays and summations for the plurality of elemental areas, said display of elemental areas having the same relative correlation as said correlated positions.

3. Apparatus as in claim 2 in which said means for scanning, labeling and measuring includes scanning means for scanning, at appropriate elemental positions, on the surface of the transducer in time-spaced sequence with one of the said multiplicity of signals being obtained at each of said elemental positions.

4. Apparatus as in claim 3 in which said scanning means includes means for sampling some only of the said elemental positions.

5. Apparatus as in claim 2 in which said means for measuring includes quantizing means for converting the received signals to digital form.

* * * * *